United States Patent [19]

Frye

[11] Patent Number: 5,404,998
[45] Date of Patent: Apr. 11, 1995

[54] WIRE CONVEYOR BELT WITH CLOSED EDGES AND METHOD OF MAKING SAME

[75] Inventor: Donald J. Frye, Manchester, N.H.

[73] Assignee: Wire Belt Company of America, Londonderry, N.H.

[21] Appl. No.: 176,915

[22] Filed: Jan. 3, 1994

[51] Int. Cl.⁶ .............................................. B65G 15/54
[52] U.S. Cl. .................................................. 198/848
[58] Field of Search ................ 198/778, 848, 849, 831

[56] References Cited

U.S. PATENT DOCUMENTS

| | | | |
|---|---|---|---|
| 1,009,670 | 11/1911 | Kihlgren | 198/848 |
| 2,149,776 | 3/1939 | Knoerzer | 198/848 |
| 2,151,913 | 3/1939 | Harter | 198/848 X |
| 2,255,364 | 9/1941 | Pink | 198/848 |
| 2,555,692 | 6/1951 | Hatch | 198/848 |
| 2,826,383 | 3/1958 | Spencer, Jr. | 198/848 X |
| 2,862,602 | 12/1958 | Greer et al. | 198/848 |
| 3,276,570 | 10/1966 | Hale et al. | 198/848 |
| 3,300,030 | 1/1967 | Scherfel | 198/848 |
| 3,542,188 | 11/1970 | Kinney, Jr. | 198/848 |
| 3,794,155 | 2/1974 | Bechtel, Jr. | 198/848 |
| 4,036,352 | 7/1977 | White | 198/848 X |
| 4,754,871 | 7/1988 | Gustafson | 198/848 |
| 5,069,331 | 12/1991 | Bartkowiak | 198/848 |

*Primary Examiner*—D. Glenn Dayoan
*Attorney, Agent, or Firm*—Daniel J. Bourque; Anthony G. M. Davis; Michael Bujold

[57] ABSTRACT

A wire conveyor belt includes a plurality of interlocked wire elements having closed ends. The interlocked wire elements have U-shaped regions which are interlocked with corresponding U-shaped regions of adjacent wire elements to form the conveyor belt. The closed end regions are formed after the wire elements have been interlocked. Each closed end region is formed by bending the end of each wire element around the adjacent interlocked wire element so that the end is adjacent to and overlapping the wire element forming a region having a substantially triangular, circular, or square shape. Each closed end region forms a space which is less than the diameter of each wire element for preventing other portions of the wire conveyor belt or other wire conveyor belts from catching on the closed end regions. A method of making such a wire conveyor belt requires first interlocking the wire elements and subsequently forming the closed end regions.

16 Claims, 2 Drawing Sheets

WIRE CONVEYOR BELT WITH CLOSED EDGES AND METHOD OF MAKING SAME

FIELD OF THE INVENTION

This invention relates to a wire conveyor belt for conveying objects such as food and in particular, to a wire conveyor belt having interlocking closed edges and a method for interlocking and closing the edges of the wire conveyor belt.

BACKGROUND OF THE INVENTION

Wire conveyor belts for conveying food and other products are well known in the art. Such conveyor belts are advantageous for food processing because they provide an open, flow-through mesh, high degree of flexibility, sanitary construction, simple installation and maintenance, and the ability to be positively driven with no tracking problems.

Prior art wire conveyor belts, such as disclosed in U.S. Pat. No. 4,754,871, include wire strands 12 (FIG. 1) having edge loops 14 which are interlocked to form a wire belt 10. In such prior art conveyor belts, the edge loops are formed prior to interlocking the wire strands and the looped ends are left open to enable the interlocking of the wire strands.

Many problems have been encountered in using the prior art wire conveyor belt having the open edge loops. For example, the open edge loops occasionally snag and interlock with each other as the wire belt is being unrolled for use. Also, two belts can not be run side by side or on top of each other with the edges touching each other without significant problems due to the open edge loops catching on each other. The open edge loops also expose a jagged edge of the wire strands and any burrs on the jagged edge can cause injury when installing or running the wire belt. Also, if the belt is installed and operated in the reverse direction, the edges of the open edge loops can cause damage to the belt and injury to the operator. Finally, the open edge loop is a weak spot on the wire conveyor belt which is susceptible to becoming unhooked or bent.

Accordingly, what is needed is a wire conveyor belt having closed edges formed by wire strands having closed edge loops which cannot easily catch other wire conveyor belts, fingers, or other objects in the processing area where the conveyor belt is used. Also, what is needed is a method of making a wire conveyor belt which will allow the conveyor belt to be formed with wire strands having edge loops closed after the strands are interlocked, to allow the edge loops to be nearly completely closed.

SUMMARY OF THE INVENTION

The present invention features a wire conveyor belt for conveying objects such as food and a wide variety of other products. The wire conveyor belt of the present invention comprises a plurality of interlocked wire elements each having a predetermined diameter.

Each of the interlocked wire elements includes first and second closed end regions proximate first and second ends of each wire element and an elongated wire body portion disposed between the first and second closed end regions. The elongated wire body portion includes at least one U-shaped region which is interlocked with a U-shaped region of at least one adjacent wire element.

Each of the first and second closed end regions includes a leg portion extending from and generally orthogonal to the elongated body portion and a bent region extending from the leg portion to a respective end of the wire element. Each leg portion is interlocked with a leg portion of an adjacent wire element.

In the preferred embodiment, each end of the interlocked wire element is spaced from the respective leg portion a distance which is less than the predetermined diameter of each of the interlocked wire elements. In the preferred embodiment, the bent region of each of the first and second closed end regions has a triangular shape. In other embodiments of the present invention, the bent region may have a substantially circular shape or a substantially square shape.

In the preferred embodiment of the present invention, each bent region is bent around a leg portion of an adjacent wire element so that the respective end of the wire element overlaps the respective leg portion of the wire element. In another embodiment of the present invention, each first and second end of each of the interlocked wire elements is soldered to the respective leg portion.

The present invention also includes a method of making a wire conveyor belt. First, the U-shaped regions in the elongated wire body portion of each wire element are formed. Second, the leg portion proximate each of the first and second end portions of each wire element is formed to extend orthogonal to the elongated wire body portion. Third, the wire elements are interlocked so that the U-shaped regions of each wire element are interlocked with at least one corresponding U-shaped region of at least one adjacent wire element, while the leg portions of each wire element are interlocked with corresponding leg portions of an adjacent wire element.

Finally, the first and second end portions of each wire element are bent around the respective leg portion of an adjacent wire element so that the respective end is adjacent the respective leg portion and spaced from the leg portion at a distance which is less than the predetermined diameter of each wire element.

In a preferred embodiment, the first and second end portions of each wire element are bent until the first and second ends overlap the respective leg portion. In another embodiment of the present invention, the method includes the step of soldering each of the first and second ends of each wire element to the respective leg portion of the wire element.

In the preferred embodiment of the present invention, the step of bending the first and second end portions includes bending the first and second end portions to form a bent region having a substantially triangular shape. In other embodiments of the present invention, the step of bending includes bending the first and second end portions to form a bent region having a substantially circular shape or a substantially square shape.

DESCRIPTION OF THE DRAWINGS

These, and other features and advantages of the present invention will be better understood by reading the following detailed description, taken together with the drawings wherein.

DETAILED DESCRIPTION OF THE INVENTION

Figure 2:
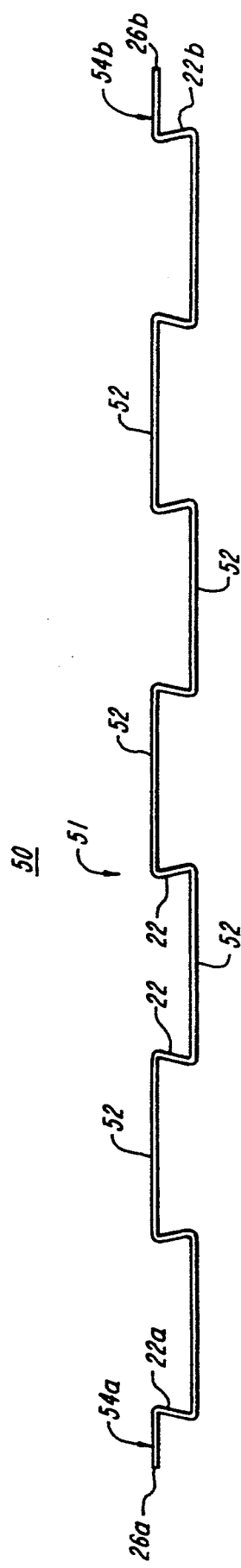
FIG. 2 is a plan view of a single wire element according to the present invention prior to interlocking with other wire elements.

The wire conveyor according to the present invention includes a plurality of wire elements 50, FIG. 2. In the preferred embodiment, each wire element 50 includes one or more of U-shaped regions 52 with leg portions 22 disposed along the body portion 51 of each wire element 50 to form a zig-zag pattern. In one embodiment, the U-shaped regions 52 are disposed in a single plane parallel to a plurality of interconnected body portions 51. In an alternative embodiment, a portion of the U-shaped regions is bent to extend out of and at an angle to the plane parallel to a plurality of interconnected body portions 51. This embodiment would allow the belt to convey objects when disposed at an incline. Alternatively, the U-shaped regions 52 could be formed as V-shaped or W-shaped regions.

Each wire element 50 includes first and second end regions 54a and 54b disposed adjacent first and second leg portions 22a, 22b proximate first and second ends 26a, 26b of the wire element 50. The leg portions 22a, 22b extend from, and orthogonal to, the body portion 51 of each wire element 50.

Figure 3:
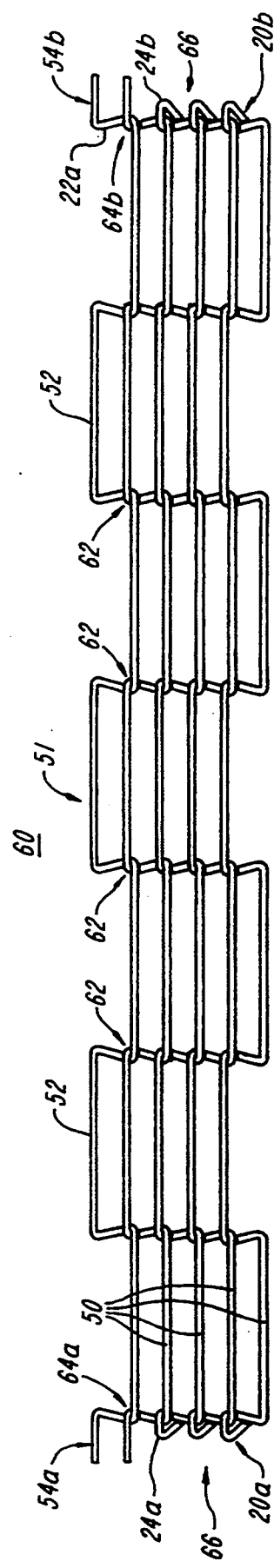
FIG. 3 is a plan view of interlocking wire elements forming a wire conveyor belt according to the present invention.

The wire elements 50 are interlocked along the body portions 51 and end portions 54 to form a wire conveyor belt 60, FIG. 3. Each U-shaped region 52 of a wire element 50 is interlocked with a corresponding U-shaped region of at least one adjacent wire element 50 to form interlocking regions 62 along the body portions 51 of each wire element 50. Each leg portion 22a, 22b is interlocked with a corresponding leg portion of an adjacent wire element 50 to form interlocking regions 64a, 64b at the end regions 54a, 54b of each wire element. After the wire elements 50 are interlocked to form the wire conveyor belt 60, the end regions 54a, 54b are formed as closed end regions 20a, 20b forming a wire conveyor belt 60 with closed edges 66. Each closed end region 20a, 20b includes a bent region 24a, 24b which secures the interlocking regions 64a, 64b and prevents the first and second ends 26a, 26b of each wire element 50 from being exposed.

Figure 1:
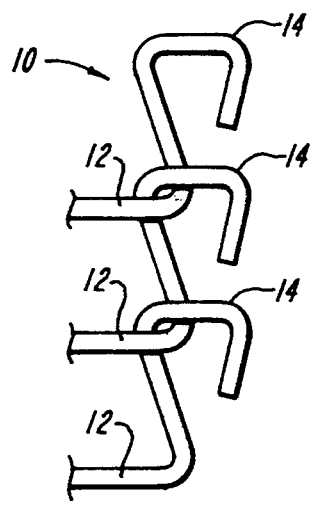
FIG. 1 is a plan view of an open end configuration of a prior art wire conveyor belt.
Figure 4B:
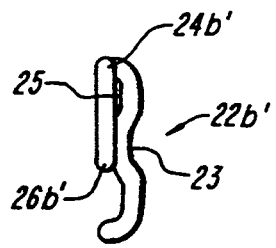
FIGS. 4A and 4B are plan and side views respectively of a closed end configuration of a wire conveyor belt according to the present invention.
Figure 4A:
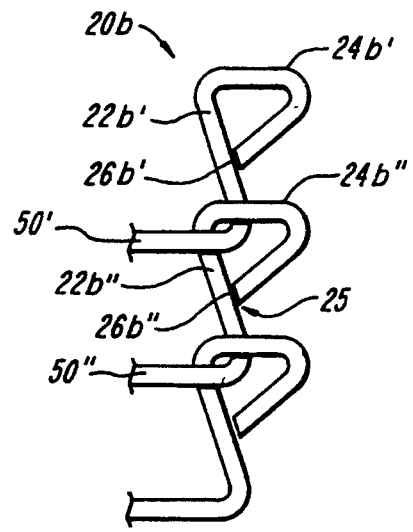

A closed end region 20b according to one embodiment of the present invention is shown in greater detail in FIGS. 4A and 4B. The bent region 24b' of wire element 50" extends from leg portion 22b" around and over leg portion 22b' of the adjacent wire element 50' to the end 26b" of the wire element 50". In the preferred embodiment, the ends 26b' and 26b" of each wire element 50' and 50" are proximate a center region of the respective and adjacent leg portions 22b' and 22b" of the wire elements 50' and 50" and are spaced from the adjacent respective leg portions 22b' and 22b" a distance 25 which is less than the predetermined diameter of each of the wire elements 50, FIGS. 4A and 4B. This closed end configuration prevents the closed edges 66 of the wire conveyor belt 60 from catching on other portions or end regions of the wire belt or other objects in the proximity of the wire conveyor belt.

Figure 6:
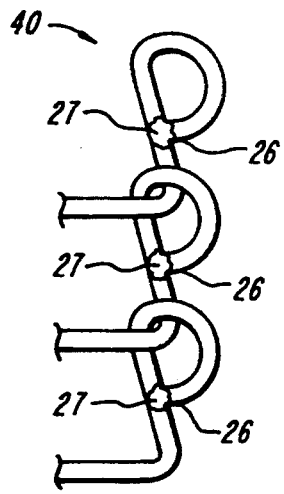
FIGS. 6 is a plan view of another embodiment of the closed end configuration having a substantially circular shape.
Figure 5:
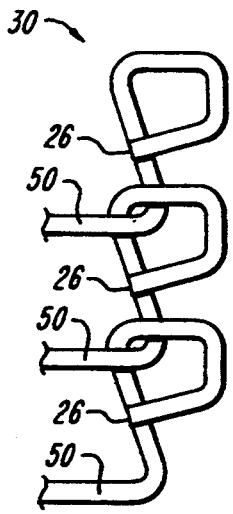
FIG. 5 is a plan view of another embodiment of the closed end configuration having a substantially square shape.

In another embodiment shown in FIG. 5, the ends 26 of each wire element 50 overlap the respective adjacent leg portions of the wire element. In a further embodiment shown in FIG. 6, the ends 26 of each wire element may be soldered or welded 27 to the leg portions 22 of the wire element after being assembled.

The preferred embodiment of one end region 20b in FIG. 4A shows substantially triangular shaped bent regions 24b' and 24b". However, alternative embodiments of the closed end regions include a substantially square shaped closed end region 30, FIG. 5, and a substantially circular shaped closed end region 40, FIG. 6.

In another embodiment, the leg portions 22 of each wire element are crimped to form a U or W-shaped region 23 having a bend in the leg portion 22 extending out of the plane of the body portion 51 in each leg 22 of each wire element. FIG. 4B shows the U or W-shaped region and bend 23 on leg portion 22b' of one of the wire elements. The bent U or W-shaped region allows the wire conveyor belt to more easily wrap around a nose bar or roller of a conveyor system, and facilitates interlocking of the wire elements.

The present invention also includes a method of making a wire conveyor belt 60, FIG. 3, having closed edges 66. First, the individual wire elements 50, FIG. 2, must be formed with the U-shaped regions 52, leg portions 22a, 22b and end regions 54a, 54b. The individual wire elements 50 are then interlocked with other wire elements by interlocking the U-shaped regions 52 and the leg portions 22a, 22b, FIG. 3. After interlocking the wire elements to form the conveyor belt 60, the end regions 54a, 54b of each wire element 50 are bent to form the closed end regions 20a, 20b. In the preferred method, the end regions 54a and 54b of each wire element 50 are bent around the body portion 51 of an adjacent wire element 50 until the ends 26a and 26b overlap or generally abut the leg portions 22a and 22b.

Modifications and substitutions by one of ordinary skill in the art are considered to be within the scope of the present invention which is not to be limited except by the claims which follow.

I claim:

1. A wire conveyor belt comprising:
a plurality of interlocked wire elements, each of said plurality of interlocked wire elements having a predetermined diameter and including:
first and second closed end regions formed proximate corresponding first and second ends of each of said plurality of interlocked wire elements;
an elongated wire body portion disposed between said first and second closed end regions, said elongated wire body portion including at least one U-shaped region interlocked with at least one U-shaped region of at least one adjacent one of said plurality of interlocked wire elements;
each of said first and second closed end regions including a leg portion extending from and generally orthogonal to said elongated body portion, a bent region extending from said leg portion of each of said first and second closed end regions to a respective one of said first and second ends of each of said plurality of interlocked wire elements, each said leg portion interlocking with one leg portion of at least one adjacent one of said plurality of interlocked wire elements;

wherein each said bent region is bent around a leg portion of an adjacent one of said plurality of interlocked wire elements such that each of said first and second ends of each of said plurality of interlocked wire elements is adjacent a respective first and second leg portion of each of said plurality of interlocked wire elements; and wherein each of said first and second ends of each of said plurality of interlocked wire elements is spaced from a respective leg portion a distance which is less than said predetermined diameter of each of said plurality of interlocked wire elements, and wherein each of said first and second ends forms an angle with said respective leg portion sufficient to prevent snagging of said first and second ends.

2. The wire conveyor belt of claim 1, wherein said elongated body portion of each of said plurality of interlocking wire elements includes a plurality of U-shaped regions, each of said plurality of U-shaped regions interlocking with a corresponding U-shaped region of at least one adjacent one of said plurality of interlocked wire elements.

3. The wire conveyor belt of claim 1, wherein said bent region of each of said first and second closed end regions of each of said plurality of interlocked wire elements has a substantially circular shape.

4. The wire conveyor belt of claim 1, wherein said bent region of each of said first and second closed end regions of each of said plurality of interlocked wire elements has a substantially triangular shape.

5. The wire conveyor belt of claim 1, wherein said bent region of each of said first and second closed end regions of each of said plurality of interlocked wire elements has a substantially square shape.

6. The wire conveyor belt of claim 1, wherein each of said first and second ends of each of said plurality of interlocked wire elements abuts a respective adjacent leg portion.

7. The wire conveyor belt of claim 6, wherein each of said first and second ends of each of said plurality of interlocked wire elements is soldered to said respective adjacent leg portion.

8. The wire conveyor belt of claim 1, wherein each of said first and second ends of each of said plurality of interlocked wire elements overlaps a respective adjacent leg portion.

9. A method of making a wire conveyor belt having a plurality of interlocked wire elements, each of said plurality of interlocked wire elements having a predetermined diameter, first and second end portions proximate first and second ends of each of said plurality of interlocked wire elements, and an elongated body portion, said method comprising:

forming at least one U-shaped region in said elongated body portion of each of a plurality of wire elements;

forming a leg portion orthogonal to said elongated body portion and proximate each of said first and second end portions of each of said plurality of wire elements;

interlocking said plurality of wire elements, wherein said at least one U-shaped region of each of said plurality of wire interlocked elements is interlocked with said at least one U-shaped region of at least one adjacent one of said plurality of wire elements, and wherein said leg portions proximate each of said first and second end portions of each of said plurality of interlocked wire elements is interlocked with a respective leg portion of at least one adjacent one of said plurality of wire elements; and bending said first and second end portions of each of said plurality of interlocked wire elements around a leg portion of an adjacent one of said plurality of wire elements to form a closed end portion having a bent region, wherein each of said first and second ends is adjacent and forms an angle with a respective said leg portion and spaced from said respective said leg portion a distance which is less than said predetermined diameter of each of said plurality of wire elements, for preventing snagging of said first and second end portions.

10. The method of making a wire conveyor belt of claim 9, wherein said step of bending said first and second end portions further includes bending said first and second end portions to form a bent region having a substantially triangular shape.

11. The method of making a wire conveyor belt of claim 9, wherein said step of bending said first and second end portions further includes bending said first and second end portions to form a bent region having a substantially circular shape.

12. The method of making a wire conveyor belt of claim 9, wherein said step of bending said first and second end portions further includes bending said first and second end portions to form a bent region having a substantially square shape.

13. The method of making a wire conveyor belt of claim 9, wherein each of said first and second end portions are bent until each of said first and second ends overlap the respective adjacent leg portion.

14. The method of making a wire conveyor belt of claim 9, further including the step of soldering each of said first and second ends of each of said plurality of wire elements to the respective adjacent leg portion.

15. A wire conveyor belt comprising:

a plurality of interlocked wire elements, each of said plurality of interlocked wire elements having a predetermined diameter and including:

first and second closed end regions formed proximate corresponding first and second ends of each of said plurality of interlocked wire elements;

an elongated wire body portion disposed between said first and second closed end regions, said elongated wire body portion including at least one U-shaped region interlocked with at least one U-shaped region of at least one adjacent one of said plurality of interlocked wire elements;

each of said first and second closed end regions including a leg portion extending from and generally lorthogonal to said elongated body portion, a bent region extending from said leg portion of each of said first and second closed end regions to a respective one of said first and second ends of each of said plurality of interlocked wire elements, each said leg portion interlocking with one leg portion of at least one adjacent one of said plurality of interlocked wire elements;

wherein each said bent region is bent around a leg portion of an adjacent one of said plurality of interlocked wire elements such that each of said first and second ends of each of said plurality of interlocked wire elements is adjacent a respective first and second leg portion of each of said plurality of interlocked wire elements; and wherein each of said first and second ends of each of said plurality of interlocked wire elements is soldered to a respective adjacent leg portion.

16. A method of making a wire conveyor belt having a plurality of interlocked wire elements, each of said plurality of interlocked wire elements having a predetermined diameter, first and second end portions proximate first and second ends of each of said plurality of interlocked wire elements, and an elongated body portion, said method comprising:

forming at least one U-shaped region in said elongated body portion of each of a plurality of wire elements;

forming a leg portion proximate each of said first and second end portions of each of said plurality of wire elements, each said leg portion extending from said elongated body portion to a respective said first and second end portion orthogonal to said elongated body portion;

interlocking said plurality of wire elements, wherein said at least one U-shaped region of each of said plurality of wire interlocked elements is interlocked with said at least one U-shaped region of at least one adjacent one of said plurality of wire elements, and wherein said leg portions proximate each of said first and second end portions of each of said plurality of interlocked wire elements is interlocked with a respective leg portion of at least one adjacent one of said plurality of wire elements;

bending said first and second end portions of each of said plurality of interlocked wire elements around a leg portion of an adjacent one of said plurality of wire elements to form a closed end portion having a bent region, wherein each of said first and second ends is adjacent a respective said leg portion; and soldering each of said first and second ends of each of said plurality of wire elements to the respective adjacent leg portion.

* * * * *